No. 695,859. Patented Mar. 18, 1902.
J. BRUUN & P. STRICKER.
SYSTEM OF OBTAINING POWER FROM VOLATILE LIQUIDS.
(Application filed Sept. 30, 1901.)
(No Model.)
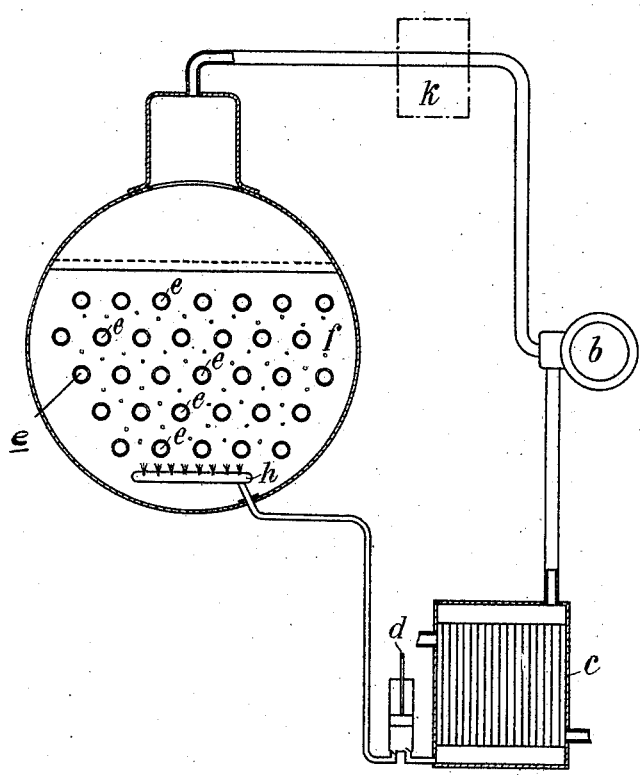

UNITED STATES PATENT OFFICE.

JULIUS BRUUN AND PAUL STRICKER, OF COPENHAGEN, DENMARK.

SYSTEM OF OBTAINING POWER FROM VOLATILE LIQUIDS.

SPECIFICATION forming part of Letters Patent No. 695,859, dated March 18, 1902.

Application filed September 30, 1901. Serial No. 77,040½. (No model.)

*To all whom it may concern:*

Be it known that we, JULIUS BRUUN and PAUL STRICKER, subjects of the King of Denmark, and residents of Copenhagen, in the Kingdom of Denmark, have invented a certain new and useful System of Obtaining Power from Volatile Liquids, of which the following is a specification and the accompanying drawing an illustration.

When using steam in steam-engines, it is necessary in order to evaporate the water to supply this with the latent heat which leaves with the exhaust-steam or is extracted by cooling-water in the condenser, thereby being lost. In other words, this latent heat is not transformed into mechanical work. In order to utilize this latent heat, it may be employed in evaporating one or another of the volatile fluids, which may be inclosed in a multitubular boiler $e$, through which is led the exhaust-steam from the steam-engine. The vapor is led from the volatile fluid to a power-engine $b$, which may be constructed as an ordinary heat-engine. The vapor of the fluid is carried from the power-engine to a condenser $c$ and is condensed by means of cooling-water, after which the fluid is pumped back to the boiler through the medium of the pump $d$. As a considerable surface must be provided through which the heat from the exhaust-steam may be conveyed to the volatile fluid, a considerable quantity of the volatile fluid is needed, making such arrangement expensive. It is not necessary, however, to have the boiler's fluid-space $f$ completely filled with this comparatively expensive fluid. For the greater part some cheap fluid which does not mix with the volatile fluid may be used—for example, water—above or underneath which is a layer of the volatile fluid, the position depending on whether the specific gravity of the fluid is higher or lower than that of the water. By means of exhaust-steam, for example, the water may be kept at a constant temperature, and the heat is imparted to the volatile fluid, vapor generating at the contact-surfaces of the two fluids, the pressure of this vapor being the highest which a mixture of saturated vapors from the two fluids with the existing temperature is able to produce. In order to make the two fluids' surface of contact as large as possible, the volatile fluid delivered from the condenser to the boiler by the feed-pump may be forced through a rose $h$, placed in the bottom or the upper part of the boiler, according as the specific gravity of the volatile fluid is lower or higher than that of the water, and the water-space of the boiler may at the same time be made deep, so that the drops of the volatile fluid must pass through a high column of water, thereby attaining completely the temperature of the latter.

Instead of using exhaust-steam for heating the boiler any other method may of course be used, and, if desired, the vapor of the volatile fluid may be superheated before being led to the power-engine.

Having thus described our invention, what we claim as new, and desire to secure by Letters Patent, is—

The system of obtaining power from volatile liquids which consists in heating said liquids in the presence of a non-commingling agency in an extended area, utilizing the resultant vapor as a source of power, reclaiming the exhaust-vapor, condensing the same, and finally discharging the condensed fluid into the non-commingling agency for further service.

In witness whereof we have hereunto set our hands in presence of two witnesses.

JULIUS BRUUN.
PAUL STRICKER.

Witnesses:
 HANS COLBERG,
 GIGGO BLANY.